(12) United States Patent
Suyama

(10) Patent No.: US 12,273,130 B2
(45) Date of Patent: Apr. 8, 2025

(54) WIRELESS COMMUNICATION DEVICE, WIRELESS COMMUNICATION SYSTEM, AND WIRELESS COMMUNICATION METHOD

(71) Applicant: Yamaha Corporation, Hamamatsu (JP)

(72) Inventor: Akihiko Suyama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 437 days.

(21) Appl. No.: 17/570,698

(22) Filed: Jan. 7, 2022

(65) Prior Publication Data

US 2022/0240150 A1 Jul. 28, 2022

(30) Foreign Application Priority Data

Jan. 26, 2021 (JP) .................................. 2021-010321

(51) Int. Cl.
*H04B 1/00* (2006.01)
*H04W 28/02* (2009.01)
*H04W 36/00* (2009.01)
*H04W 36/30* (2009.01)

(52) U.S. Cl.
CPC ........ *H04B 1/006* (2013.01); *H04W 28/0226* (2013.01); *H04W 36/0044* (2013.01)

(58) Field of Classification Search
CPC ........... G10H 1/0083; G10H 2220/391; G10H 2220/395; H04B 1/006; H04W 28/0226; H04W 36/0044; H04W 36/30; H04W 4/38; H04W 84/12
See application file for complete search history.

(56) References Cited

U.S. PATENT DOCUMENTS

| | | | | |
|---|---|---|---|---|
| 2008/0215333 A1* | 9/2008 | Tewfik | ............... | H04N 21/8358 |
| | | | | 704/E19.01 |
| 2016/0198318 A1* | 7/2016 | Ogawa | ..................... | H04W 4/10 |
| | | | | 455/15 |
| 2022/0225008 A1* | 7/2022 | Lee | ....................... | H04R 1/1041 |

FOREIGN PATENT DOCUMENTS

| | | | |
|---|---|---|---|
| JP | 2006-186816 A | 7/2006 | |
| JP | 5307694 B2 | 10/2013 | |
| WO | WO-2021165238 A1 * | 8/2021 | ............. G02C 11/06 |

\* cited by examiner

*Primary Examiner* — Melvin C Marcelo
*Assistant Examiner* — Natali Pascual Peguero
(74) *Attorney, Agent, or Firm* — Crowell & Moring LLP

(57) ABSTRACT

A wireless communication device includes an information wireless communication unit configured to transmit control information by a first wireless communication method; a sound signal transmission unit configured to transmit a sound signal by a second wireless communication method; and a selection controller configured to select any one or both of a first transmission processing of transmitting the control information from the information wireless communication unit by the first wireless communication method and a second transmission processing of embedding the control information in the sound signal and transmitting the control information from the sound signal transmission unit by the second wireless communication method.

12 Claims, 9 Drawing Sheets

WIRELESS COMMUNICATION DEVICE, WIRELESS COMMUNICATION SYSTEM, AND WIRELESS COMMUNICATION METHOD

CROSS-REFERENCE TO RELATED APPLICATIONS

This application is based on and claims priority under 35 USC 119 from Japanese Patent Application No. 2021-010321 filed on Jan. 26, 2021, the contents of which are incorporated herein by reference.

TECHNICAL FIELD

The present invention relates to a wireless communication device, a wireless communication system, and a wireless communication method.

BACKGROUND ART

In recent years, in an event venue such as a live performance, control information or the like used for performance may be transmitted using wireless communication. As the wireless communication, for example, wireless communication by a wireless LAN is generally used. Further, a technology of transmitting sound data and other data by the wireless communication is known (see Patent Literature 1 and Patent Literature 2).

CITATION LIST

Patent Literature

Patent Literature 1 Japanese Patent No. 5307694
Patent Literature 2 JP-A-2006-186816

SUMMARY OF INVENTION

However, the wireless communication by the wireless LAN may become unstable in the event venue, and it is necessary to reinforce the wireless communication by using a wireless LAN router or the like having a stronger radio wave intensity. Therefore, there is a demand for wireless communication that enables simple and stable communication even in a situation where a communication environment of the wireless LAN such as the event venue is poor.

The present invention has been made to solve the above-described problems, and an object thereof is to provide a wireless communication device, a wireless communication system, and a wireless communication method that can perform simple and stable wireless communication.

In order to solve the above-described problems, an aspect of the present invention provides a wireless communication device. The wireless communication device includes an information wireless communication unit configured to transmit control information by a first wireless communication method; a sound signal transmission unit configured to transmit a sound signal by a second wireless communication method; and a selection controller configured to select at least one of a first transmission processing of transmitting the control information from the information wireless communication unit by the first wireless communication method or a second transmission processing of embedding the control information in the sound signal and transmitting the control information from the sound signal transmission unit by the second wireless communication method.

Further, an aspect of the present invention provides a wireless communication device including: a sensor configured to detect detection information; a sound collection unit configured to collect a surrounding sound to generate a sound signal; and a sound signal transmission unit configured to embed the detection information in the sound signal and transmit the detection information by wireless communication.

Further, an aspect of the present invention provides a wireless communication system including: the above-described wireless communication device; and a processing apparatus configured to receive a sound signal in which the control information is embedded from the wireless communication device and to execute a processing based on the control information.

Further, an aspect of the present invention provides a wireless communication method for a wireless communication device including an information wireless communication unit configured to transmit control information by a first wireless communication method and a sound signal transmission unit configured to transmit a sound signal by a second wireless communication method. The wireless communication method includes a first transmission step of transmitting the control information from the information wireless communication unit by the first wireless communication method; a second transmission step of embedding the control information in the sound signal and transmitting the control information from the sound signal transmission unit by the second wireless communication method; and a selection step of selecting at least one of the first transmission step or the second transmission step by a selection controller.

According to the present invention, it is possible to perform simple and stable wireless communication.

DESCRIPTION OF EMBODIMENTS

Hereinafter, a wireless communication device, a wireless communication system, and a wireless communication method according to embodiments of the present invention will be described with reference to the drawings.

First Embodiment

Figure 1:
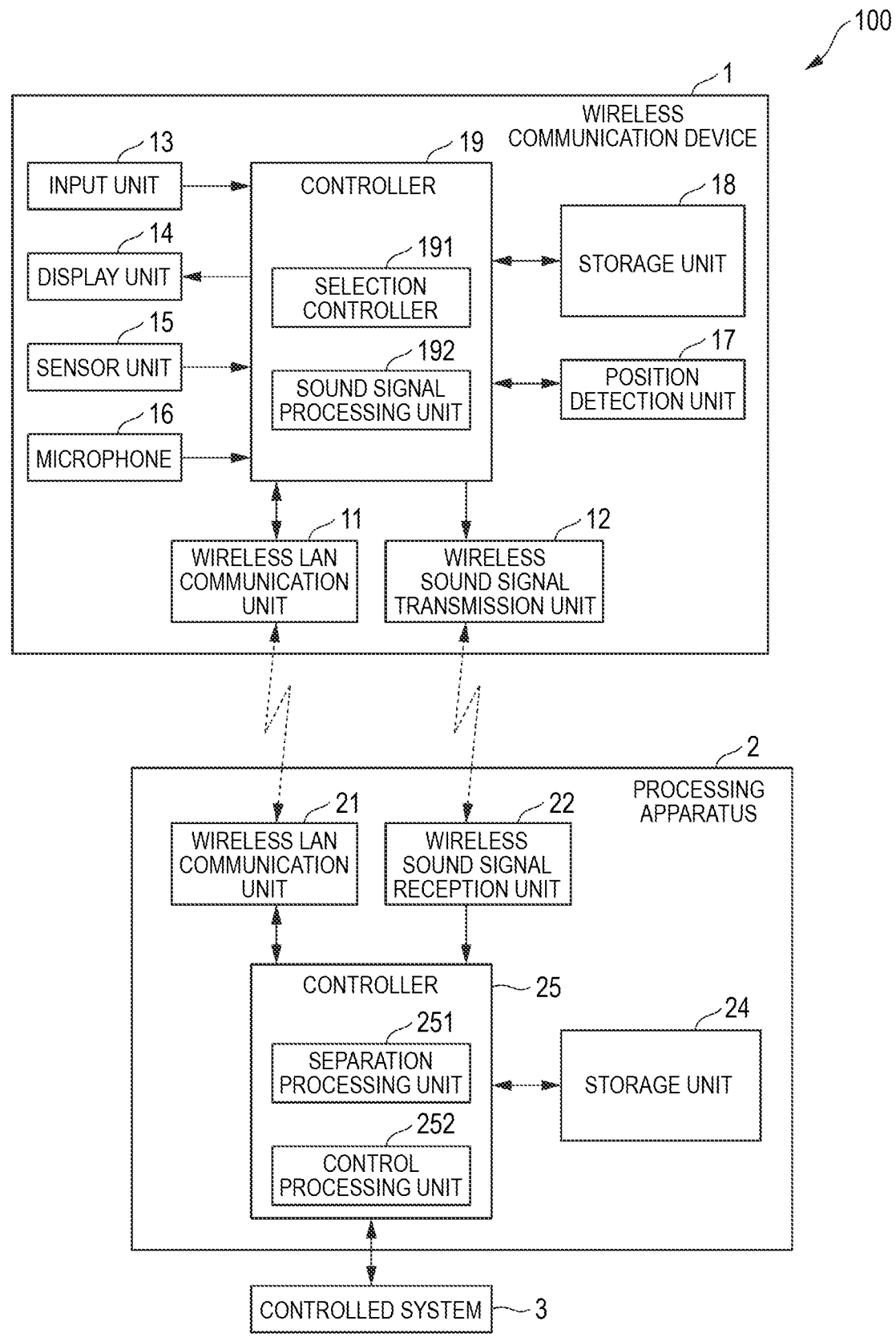
FIG. 1 is a block diagram showing an example of a wireless communication system according to a first embodiment.

FIG. 1 is a schematic block diagram showing an example of a wireless communication system 100 according to the present embodiment.

As shown in FIG. 1, the wireless communication system 100 includes a wireless communication device 1, a processing apparatus 2, and a controlled system 3.

The wireless communication device 1 is, for example, a smartphone, or a tablet terminal, and is a communication device that can be carried by a user in an event such as a concert or a live performance. The wireless communication device 1 includes a wireless local area network (LAN) communication unit 11, a wireless sound signal transmission unit 12, an input, unit 13, a display unit 14, a sensor unit 15, a microphone 16, a position detection unit 17, a storage unit 18, and a controller 19.

The wireless LAN communication unit 11 (an example of an information wireless communication unit) performs data communication with another wireless communication device (for example, the processing apparatus 2) by a wireless LAN communication method (a first wireless communication method). The wireless LAN communication unit 11 transmits, for example, control information described later to the processing apparatus 2 by the wireless LAN communication method.

The wireless sound signal transmission unit 12 (an example of a sound signal transmission unit) transmits a sound signal to another wireless communication device (for example, the processing apparatus 2) by a wireless microphone communication method (a second wireless communication method). The wireless microphone communication method. is, for example, a wireless communication method using radio waves of a 300 MHz. (megahertz) band or an 800 MHz band, and is a wireless communication method using a frequency band different from that of the wireless LAN communication method.

The input unit 13 is, for example, an input device such as a key input unit or a touch sensor, receives various kinds of information from the user, and supplies the various kinds of information to the controller 19.

The display unit 14 is, for example, a display apparatus such as a liquid crystal display, and displays various kinds of information output from the controller 19.

The input unit 13 and the display unit 14 may be touch screens arranged on a surface of a housing of the wireless communication device 1 in an overlapping manner.

The sensor unit 15 (an example of a sensor) includes various sensors that detect detection information. The sensor unit 15 is, for example, a gyro sensor, and detects angle information (inclination information or posture information) of the wireless communication device 1 as the detection information. Further, the sensor unit 15 may be, for example, an acceleration sensor, and may detect a movement of the wireless communication device 1 based on acceleration as the detection information. The sensor unit 15 outputs the detected detection information to the controller 19.

The microphone 16 (an example of a sound collection unit) collects a sound around the wireless communication device 1 and operates a sound signal. The microphone 16 outputs the generated sound signal to the controller 19.

The position detection unit 17 (an example of a sensor) is, for example, a global positioning system (GPS) module, and detects position information of the wireless communication device 1 as the detection information. The position detection unit 17 outputs the detected position information to the controller 19.

The storage unit 18 stores various kinds of information used by the wireless communication device 1. The storage unit 18 stores, for example, data of a sound signal, various kinds of detection information, and various kinds of control information.

The controller 19 is, for example, a processor including a central processing unit (CPU), and executes various kinds of control of the wireless communication device 1. The controller 19 transmits control information to the processing apparatus 2 by using any one of the wireless LAN communication unit 11 and the wireless sound signal transmission unit 12. Here, a processing of transmitting the control information by the wireless LAN communication method by using the wireless LAN communication unit 11 is referred to as a first transmission processing. Further, a processing of embedding the control information in the sound signal and transmitting the control information by the wireless microphone communication method by using the wireless sound signal transmission unit 12 is referred to as a second transmission processing.

The control information transmitted to the processing apparatus 2 includes, for example, control information based on operation information received by the input unit 13, the angle information detected by the sensor unit 15, and the position information detected by the position detection unit 17. The controller 19 acquires these pieces of control information, selects any one or both of the first transmission processing and the second transmission processing, and transmits the acquired control information to the processing apparatus 2.

Further, the controller 19 includes a selection controller 191 and a sound signal processing unit 192.

The selection controller 191 selects any one or both of the first transmission processing and the second transmission processing. The selection controller 191 selects the second transmission processing, for example, when the wireless sound signal transmission unit 12 is in a state where a sound signal can be transmitted. Further, the selection controller 191 may select the second transmission processing when the wireless sound signal transmission unit 12 is connected to the processing apparatus 2 by the wireless microphone communication method. Further, when wireless communication intensity or wireless communication quality of the wireless LAN communication method becomes equal to or smaller than a predetermined threshold, the selection controller 191 may select the second transmission processing and switch a processing from the first transmission processing to the second transmission processing. Further, the selection controller 191 may select and switch any one of the first transmission processing and the second transmission processing manually by the user based on the operation information received by the input unit 13.

When the switching is manually performed by the user, the selection controller 191 may display, on the display unit 14, whether the wireless sound signal transmission unit 12 is connected to the processing apparatus 2, and the wireless communication intensity and the wireless communication quality of the wireless LAN such that the user can confirm the connection, the wireless communication intensity, and the wireless communication quality. Further, the selection controller 191 may simultaneously select both the first transmission processing and the second transmission processing to provide redundancy.

The sound signal processing unit 192 executes a processing of embedding control information in a sound signal. The sound signal processing unit 192 executes the processing of embedding the control information in the sound signal by using an existing method (for example, a method described in JP-A-2016-75890). As the sound signal, a sound signal generated by collecting sound by the microphone 16 may be used, or a sound signal stored in advance by the storage unit 18 may be used. Further, the sound signal also includes a sound signal in a case of silence. The sound signal in which the control information is embedded and that is generated by the sound signal processing unit 192 is used in the second transmission processing described above.

The processing apparatus 2 (an example of another wireless communication device) is a reception apparatus of control information and a sound signal, and includes a wireless LAN communication unit 21, a wireless sound signal reception cant 22, a storage unit 24, and a controller 25. The processing apparatus 2 executes a processing based on the control information received from the wireless communication device 1 on the controlled system 3. For example, when receiving a sound signal from the wireless communication device 1 by the second communication processing described above, the processing apparatus 2 receives a sound signal in which control information is embedded from the wireless communication device 1, and executes a processing based on the control information.

The wireless LAN communication unit 21 performs data communication with the wireless communication device 1 by the wireless LAN communication method (first wireless communication method).

The wireless sound signal reception unit 22 receives a sound signal from the wireless communication device 1 by the wireless microphone communication method (second wireless communication method). The sound signal received by the wireless sound signal reception unit 22 includes the above-described sound signal in which the control information is embedded and a normal sound signal in which the control information is not embedded. The wireless sound signal reception unit 22 outputs the received sound signal to the controller 25.

The storage unit 24 stores various kinds of information used by the processing apparatus 2. The storage unit 24 stores, for example, data of the received sound signal, and various kinds of control information.

The controller 25 is, for example, a processor including a CPU, and executes various kinds of control of the processing apparatus 2. The controller 25 acquires the control information received from the wireless communication device 1, transmits the acquired control information to the controlled system 3, and controls the controlled system 3. When the control information is embedded in the received sound signal, the controller 25 executes a separation processing of separating the sound signal and the control information. Further, the controller 25 transmits the sound signal received from the wireless communication device 1 to the controlled system 3.

Further, the controller 25 includes a separation processing unit 251 and a control processing unit 252.

When the control information is embedded in the received sound signal, the separation processing unit 251 separates the received sound signal into control information and an original sound signal before the embedding.

The control processing unit 252 acquires the control information embedded in the sound signal received by the wireless sound signal reception unit 20, and executes a processing based on the control information. Based on the acquired control information, the control processing unit 252 executes various control processing such as processing a sound signal and switching an output destination of a sound signal of the controlled system 3. For example, when the control information is position information in an event venue, the control processing unit 252 performs a processing of converting the received sound signal into a sound signal corresponding to the position information (3D acoustic processing), transmits the sound signal to the controlled system 3, and causes the controlled system 3 to output a converted 3D acoustic (stereophonic acoustic) sound signal. The position information in the event venue is, for example, three-dimensional position information of a cubic space in which the event venue or a concert hall is defined as the cubic space. The control processing unit 252 may transmit the position information to the controlled system 3 and perform the 3D acoustic processing in the controlled system 3.

The control processing unit 252 may generate a sound signal in which sound image localization is changed in accordance with the position information or the angle information, and transmit the sound signal to the controlled system 3 for output. For example, the control processing unit 252 may calculate a direction of the wireless communication device 1 based on the angle information, and perform an acoustic control of disposing a sound or the like at an intersection of the direction and a wall.

The controlled system 3 is a system of a control target, and is, for example, an acoustic system in an event venue. When the controlled system 3 is the acoustic system, the controlled system 3 outputs a sound signal from a speaker provided in the acoustic system under control of the control processing unit 252.

Next, an operation of the wireless communication system 100 according to the present embodiment will be described with reference to the drawings.

Figure 2:
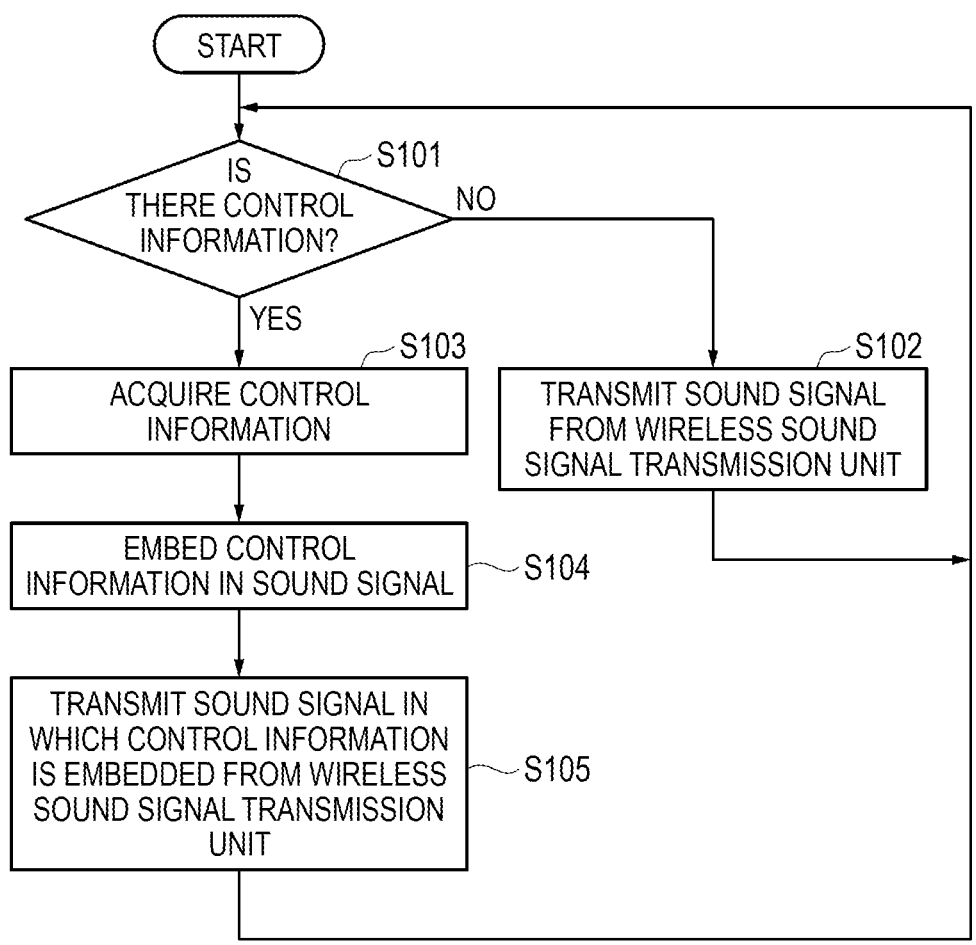
FIG. 2 is a flowchart showing an example of a transmission processing of control information using a wireless sound signal transmission unit according to the first embodiment.

FIG. 2 is a flowchart showing an example of the transmission processing of the control information using the wireless sound signal transmission unit 12 of the present embodiment. That is, here, details of the second transmission processing will be described.

As shown in FIG. 2, the controller 19 of the wireless communication device 1 first determines whether there is control information (step S101). The controller 19 determines whether the input unit 13, the sensor unit 15, and the position detection unit 17 have received or detected the control information. When there is the control information in the input unit 13, the sensor unit 15, the position detection unit 17, or the like (step S101: YES), the controller 19 advances the processing to step S103. Further, when there is no control information in the input unit 13, the sensor unit 15, the position detection unit 17, or the like (step S101: NO), the controller 19 advances the processing to step S102.

In step S102 (when there is no control information), the controller 19 transmits a sound signal from the wireless sound signal transmission unit 12. For example, the controller 19 causes the wireless sound signal transmission unit 12 to transmit a sound signal collected by the microphone 16 or a sound signal stored in the storage unit 18 as it is. After the processing of step S102, the controller 19 returns the processing to step S101.

In step S103 (when there is the control information), the controller 19 acquires the control information. The controller 19 acquires, for example, the control information based on the operation information received by the input unit 13 or the detection information (the position information, the angle information, or the like) detected by the sensor unit 15 or the position detection unit 17 as the control information.

Next, the sound signal processing unit 192 of the controller 19 embeds the control information in the sound signal (step S104). The sound signal processing unit 192 executes a processing of embedding the control information in, for example, the sound signal collected by the microphone 16 or the sound signal stored in the storage unit 18 by using an existing method.

Next, the controller 19 transmits the sound signal in which the control information is embedded from the wireless sound signal transmission unit 12 (step S105). The controller 19 outputs, to the wireless sound signal transmission unit 12, the sound signal in which the control information is embedded and that is generated by the sound signal processing unit 192. The wireless sound signal transmission unit 12 transmits the sound signal in which the control information is embedded to the processing apparatus 2 by the wireless microphone communication method. After the processing of step S105, the controller 19 returns the processing to step S101.

Next, details of a processing of the selection controller 191 of the present embodiment will be described.

Figure 3:
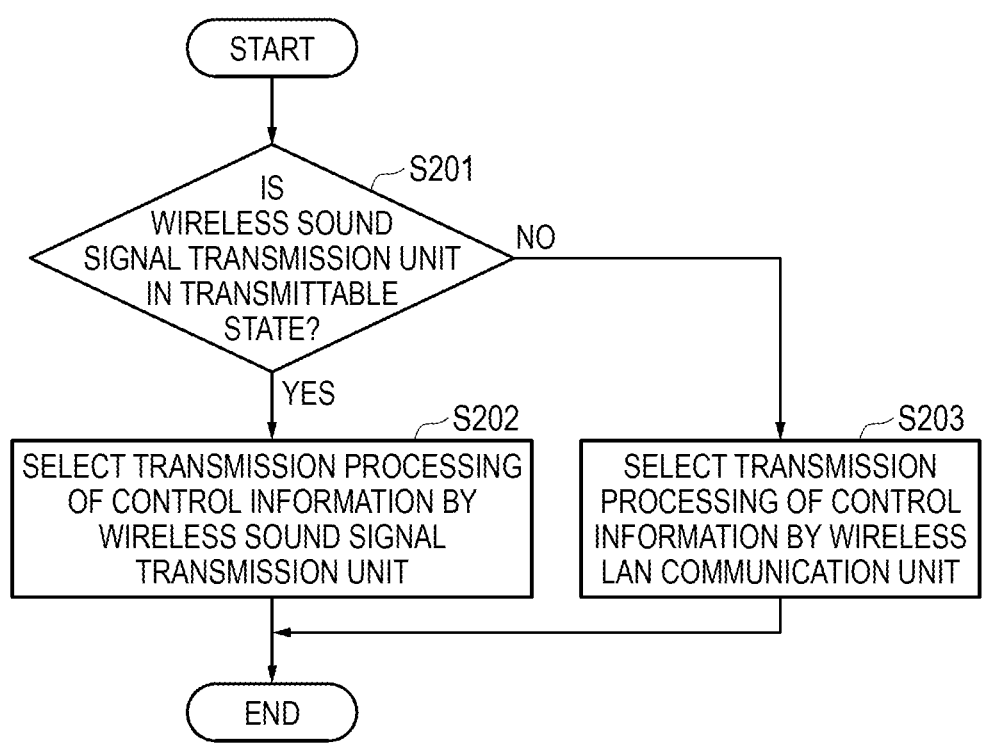
FIG. 3 is a flowchart showing an example of a processing of a selection controller according to the first embodiment.

FIG. 3 is a flowchart showing an example of the processing of the selection controller 191 of the present embodiment. The selection controller 191 periodically executes the processing shown in FIG. 3.

As shown in FIG. 3, the selection controller 191 first determines whether the wireless sound signal transmission unit 12 is in a transmittable state (step S201). When the wireless sound signal transmission unit 12 is in the transmittable state (step S201: YES), the selection controller 191 advances the processing to step S202. Further, when the wireless sound signal transmission unit 12 is not in the transmittable state (step S201: NO), the selection controller 191 advances the processing to step S203.

In step S202, the selection controller 191 selects the transmission processing of the control information by the wireless sound signal transmission unit 12. That is, the selection controller 191 selects the second transmission processing. After the processing of step S202, the selection controller 191 ends the processing.

In step S203, the selection controller 191 selects the transmission processing of the control information by the wireless LAN communication unit 11. That is, the selection controller 191 selects the first transmission processing. After the processing of step S203, the selection controller 191 ends the processing.

Next, details of the separation processing and the control processing of the control information performed by the processing apparatus 2 of the present embodiment will be described with reference to FIG. 4.

Figure 4:
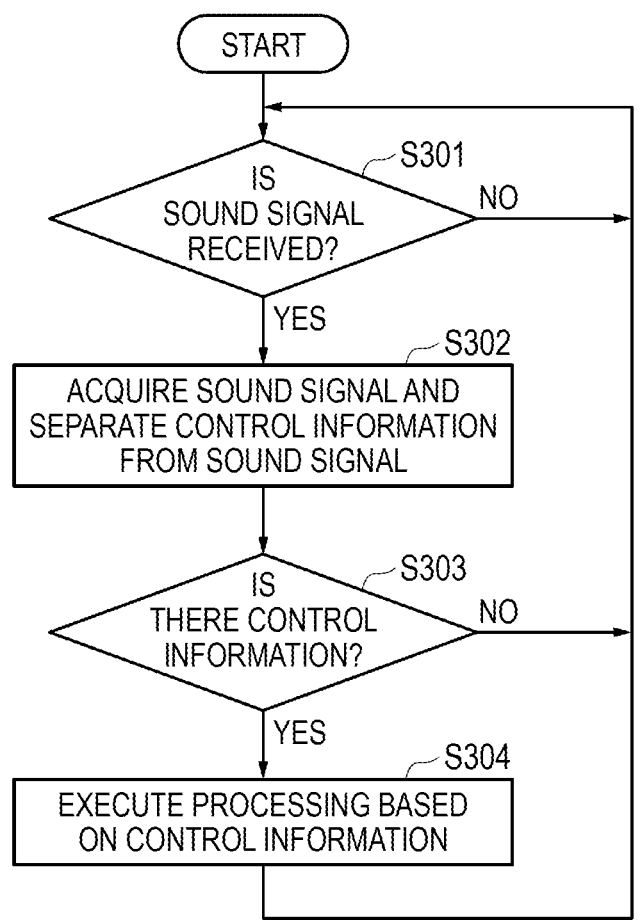
FIG. 4 is a flowchart showing an example of a separation processing and a control processing of the control information performed by a processing apparatus according to the first embodiment.

FIG. 4 is a flowchart showing an example of the separation processing and the control processing of the control information performed by the processing apparatus 2 of the present embodiment. The example shown in FIG. 4 is an example of a case where the control information is transmitted to the processing apparatus 2 by the second transmission processing.

As shown in FIG. 4, the separation processing unit 251 of the processing apparatus 2 first determines whether a sound signal is received (step S301). When the sound signal is received by the wireless sound signal reception unit 22 (step S301: YES), the separation processing unit 251 advances the processing to step S302. Further, when the sound signal is not received by the wireless sound signal reception unit 22 (step S301: NO), the separation processing unit 251 returns the processing to step S301.

In step S302, the separation processing unit 251 acquires a sound signal and separates control information from the sound signal. The separation processing unit 251 stores the separated sound signal in the storage unit 24.

Next, the control processing unit 252 of the processing apparatus 2 determines whether there is the control information separated by the separation processing unit 251 (step S303). When there is the control information (step S303: YES), the control processing unit 252 advances the processing to step S304. Further, when there is no control information (step S303: NO), the control processing unit 252 returns the processing to step S301.

In step S304, the control processing unit 252 executes a processing based on the control information. For example, the control processing unit 252 performs a processing (3D acoustic processing) of converting a sound signal acquired as the control information into a sound signal corresponding to position information, transmits the sound signal to the controlled system 3, and causes the controlled system 3 to output a converted 3D acoustic (stereophonic acoustic) sound signal. After the processing of step S304, the control processing unit 252 returns the processing to step S301.

Next, a modified example of the processing of the selection controller 191 of the present embodiment will be described with reference to FIGS. 5 and 6.

Figure 5:
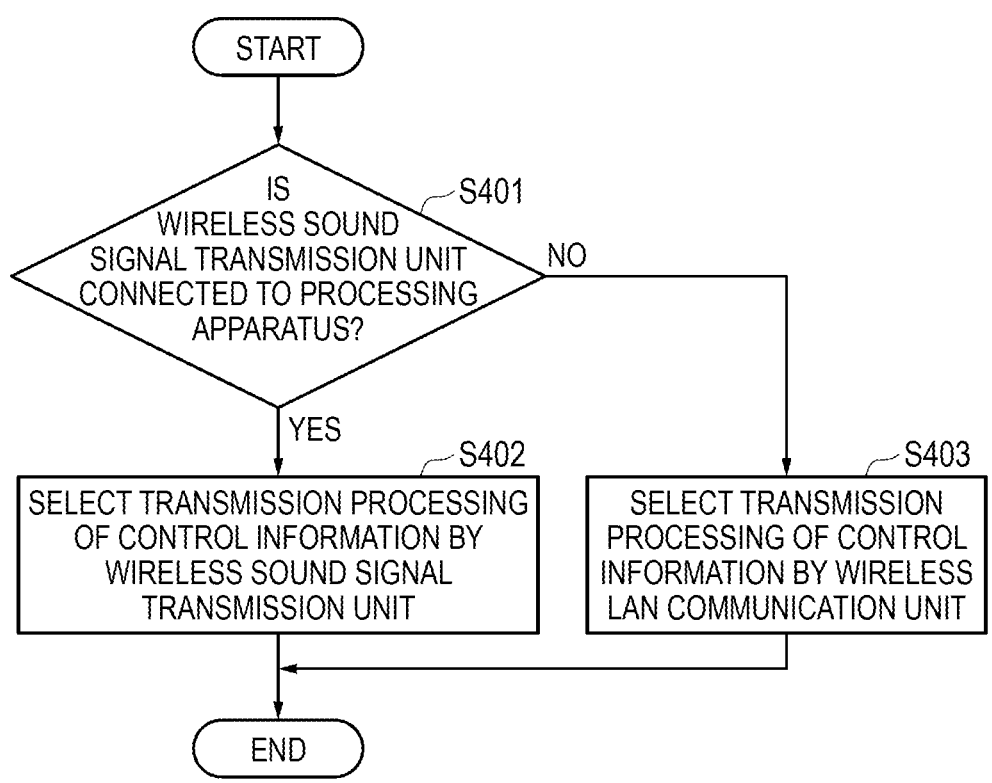
FIG. 5 is a flowchart showing a first modified example of the processing of the selection controller according to the first embodiment.

FIG. 5 is a flowchart showing a first modified example of the processing of the selection controller 191 of the present embodiment. The selection controller 191 periodically executes the processing shown in FIG. 5.

As shown in FIG. 5, the selection controller 191 first determines whether the wireless sound signal transmission unit 12 is connected to the processing apparatus 2 (step S401). The selection controller 191 determines whether the wireless sound signal transmission unit 12 is connected to the processing apparatus 2 by the wireless microphone communication method. When the wireless sound signal transmission unit 12 is connected to the processing apparatus 2 (step S401: YES), the selection controller 191 advances the processing to step S402. Further, when the wireless sound signal transmission unit 12 is not connected to the processing apparatus 2 (step S401: NO), the selection controller 191 advances the processing to step S403.

Since processing of step S402 and step S403 are the same as the processings of step S202 and step S203 shown in FIG. 3 described above, description thereof will be omitted here. That is, in step S402, the selection controller 191 selects the second transmission processing, and in step S403, the selection controller 191 selects the first transmission processing, FIG. 6 is a flowchart showing a second modified example of the processing of the selection controller 191 of the present embodiment. The selection controller 191 periodically executes the processing shown in FIG. 6.

Figure 6:
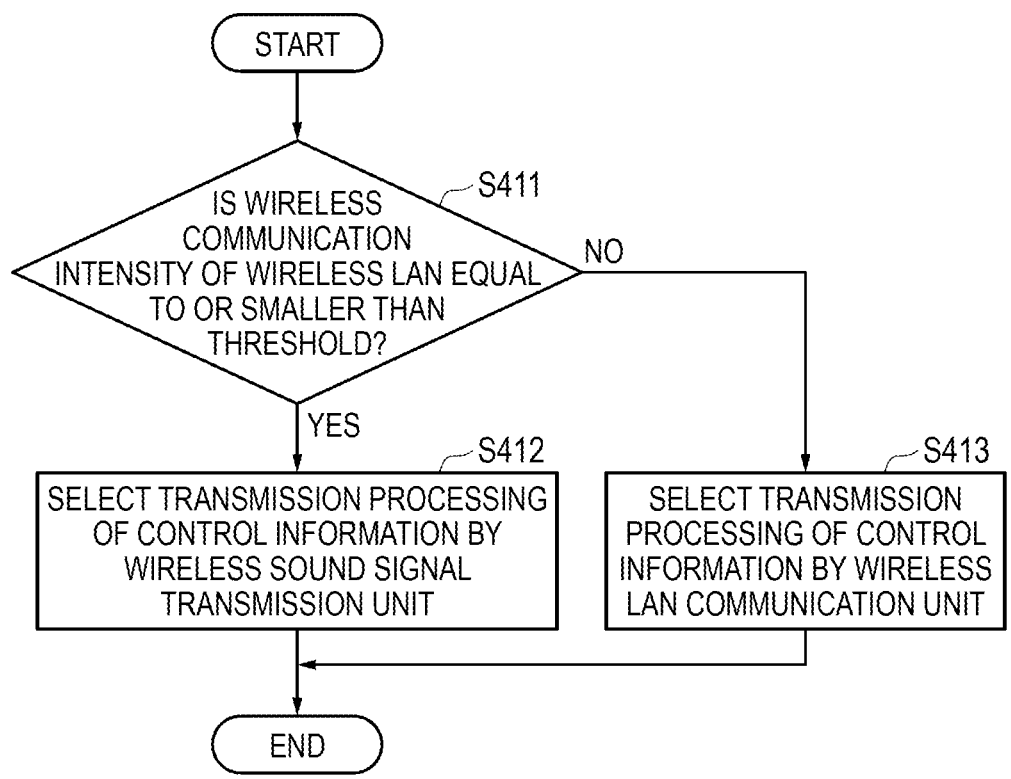
FIG. 6 is a flowchart showing a second modified example of the processing of the selection controller according to the first embodiment.

As shown in FIG. 6, the selection controller 191 first determines whether the wireless communication intensity of the wireless LAN is equal to or smaller than a threshold (step S411), the selection controller 191 acquires the wireless communication intensity (received radio wave intensity) detected by the wireless LAN communication unit 11, and determines whether the wireless communication intensity (received radio wave intensity) is equal to or smaller than a predetermined threshold (whether the wireless communication intensity is reduced to be equal to or smaller than the threshold). When the wireless communication intensity of the wireless LAN is equal to or smaller than the threshold (step S411; YES), the selection controller 191 advances the processing to step S412. Further, when the wireless communication intensity of the wireless LAN is not equal to or smaller than the threshold (larger than the threshold) (step S411: NO), the selection controller 191 advances the processing to step S413.

Since processings of step S412 and step S413 are the same as the processings of step S202 and step S203 shown in FIG. 3 described above, description thereof will be omitted here. That is, in step S402, the selection controller 191 selects the second transmission processing, and in step S403, the selection controller 191 selects the first transmission processing, The selection processings by the selection controller 191 shown in FIGS. 3, 5, and 6 may be performed. independently, or may be performed by combining selection conditions.

As described above, the wireless communication device 1 according, to the present embodiment includes the wireless LAN communication unit 11 (information wireless communication unit), the wireless sound signal transmission unit 12 (sound signal transmission unit), and the selection controller 191. The wireless LAN communication unit 11 transmits the control information by the wireless LAN communication method (first wireless communication method). The wireless sound signal transmission unit 12 transmits the sound signal by the wireless microphone communication method (second wireless communication method). The selection controller 191 selects any one or both of the first transmission processing of transmitting the control information from the wireless LAN communication unit 11 by the wireless LAN communication method and the second transmission processing of embedding the control information in the sound signal and transmitting the control information from the wireless sound signal transmission unit 12 by the wireless microphone communication method.

Accordingly, the wireless communication device 1 according to the present. embodiment selectively switches and uses the first transmission processing of transmitting the control information by the wireless sound signal transmission unit 12 and the second transmission processing of embedding the control information in the sound signal and transmitting the control information as the sound signal by the wireless sound signal transmission unit 12. Therefore, the wireless communication device 1 according to the present embodiment selects any one or both of the first transmission processing of transmitting the control information by the wireless LAN communication method (first wireless communication method) and the second transmission processing of embedding the control information in the, sound signal and transmitting the control information by the wireless microphone communication method (second wireless communication method), so that the control information can be transmitted by switching between the two wireless communication methods in accordance with a situation. Further, the wireless communication device 1 according to the present: embodiment transmits the control information by using a simple and stable wireless communication method called a wireless microphone communication method that has been conventionally used for an event or the like. Therefore, the wireless communication device 1 according to the present embodiment can implement simple and stable wireless communication even in a situation where a communication environment of the wireless LAN such as an event venue is poor.

In the present embodiment, the selection controller 191 selects the second transmission processing described above when the wireless sound signal transmission unit 12 is in a state where the sound signal can be transmitted.

Accordingly, when the wireless sound signal transmission unit 12 is in a state (valid state) where the sound signal can be transmitted, the wireless communication device 1 according to the present embodiment can automatically select the second transmission processing of embedding the control information in the sound signal, and can implement stable wireless communication while improving convenience.

In the present embodiment, the selection controller 191 may select the second transmission processing when the wireless sound signal transmission unit 12 is connected to another wireless communication device (for example, the processing apparatus 2) by the wireless microphone communication method.

Accordingly, when the wireless sound signal transmission unit 12 is connected to another wireless communication device (for example, the processing apparatus 2), the wireless communication device 1 according to the present embodiment can automatically select the second transmission processing of embedding the control information in the sound signal, and can implement the stable wireless communication while improving convenience.

In the present embodiment, when the wireless communication intensity of the wireless LAN communication method is equal to or smaller than the threshold, the selection controller 191 selects the second transmission processing and switches a processing from the first transmission processing to the second transmission processing.

Accordingly, when the wireless communication intensity of the wireless LAN communication method decreases and communication by the wireless LAN communication method becomes unstable, the wireless communication device 1 according to the present embodiment can automatically switch to the second transmission processing of embedding the control information in the sound signal, and can implement the stable wireless communication while improving he convenience.

The wireless communication device 1 according to the present, embodiment. includes the sensor (the sensor unit 15 or the position detection unit 17) that detects the detection information. The control information includes the detection information detected by the sensor (the sensor unit 15 or the position detection unit 17). That is, the wireless sound signal transmission unit 12 transmits the detection information as the control information.

Accordingly, since the wireless communication device 1 according to the present embodiment transmits the detection information of the sensor (the sensor unit 15 or the position detection unit 17) as the control information, it is possible to perform more complicated control processing using the detection information.

In the present embodiment, the sensor (sensor unit 15) described above is, for example, the gyro sensor. The wireless sound signal. transmission unit 12 transmits the detection information detected by the gyro sensor as the control information, Accordingly, the wireless communication device 1 according to the present embodiment can perform a performance processing such as controlling a sound source position of the 3D acoustic processing by using angle information of the gyro sensor in an event venue such as a concert or a live performance.

The wireless communication system 100 according to the present embodiment includes the above-described wireless communication device 1 and the processing apparatus 2 that receives the sound signal in which the control information is embedded from the wireless communication device and executes the processing based on the control information.

Accordingly, the wireless communication system 100 according to the present. embodiment can achieve the same effects as those of the wireless communication device 1 described above, and can implement simple and stable wireless communication.

The wireless communication method according to the present embodiment is a wireless communication method of the wireless communication device 1 including the wireless LAN communication unit 11 that transmits the control information by the wireless LAN communication method and the wireless sound signal transmission unit 12 that transmits the sound signal by the wireless microphone communication method, and includes the selection step. In the selection step, the selection controller 191 selects any one or both of the first transmission processing of transmitting the control information from the wireless LAN communication unit 11 by the wireless LAN communication method arid the second transmission processing of embedding the control information in the sound signal and transmitting the control information from the wireless sound signal transmission unit 12 by the wireless microphone communication method, Accordingly, the wireless communication method according to the present embodiment can achieve the same effects as those of the wireless communication device 1 described above, and can implement simple and stable wireless communication.

Second Embodiment

Next, a wireless communication system 100a and a wireless communication device 1a according to a second embodiment will be described with reference to FIG. 7. In the present embodiment, a modified example in which control information is embedded in a sound signal and bidirectional communication is performed by wireless communication will be described.

Figure 7:
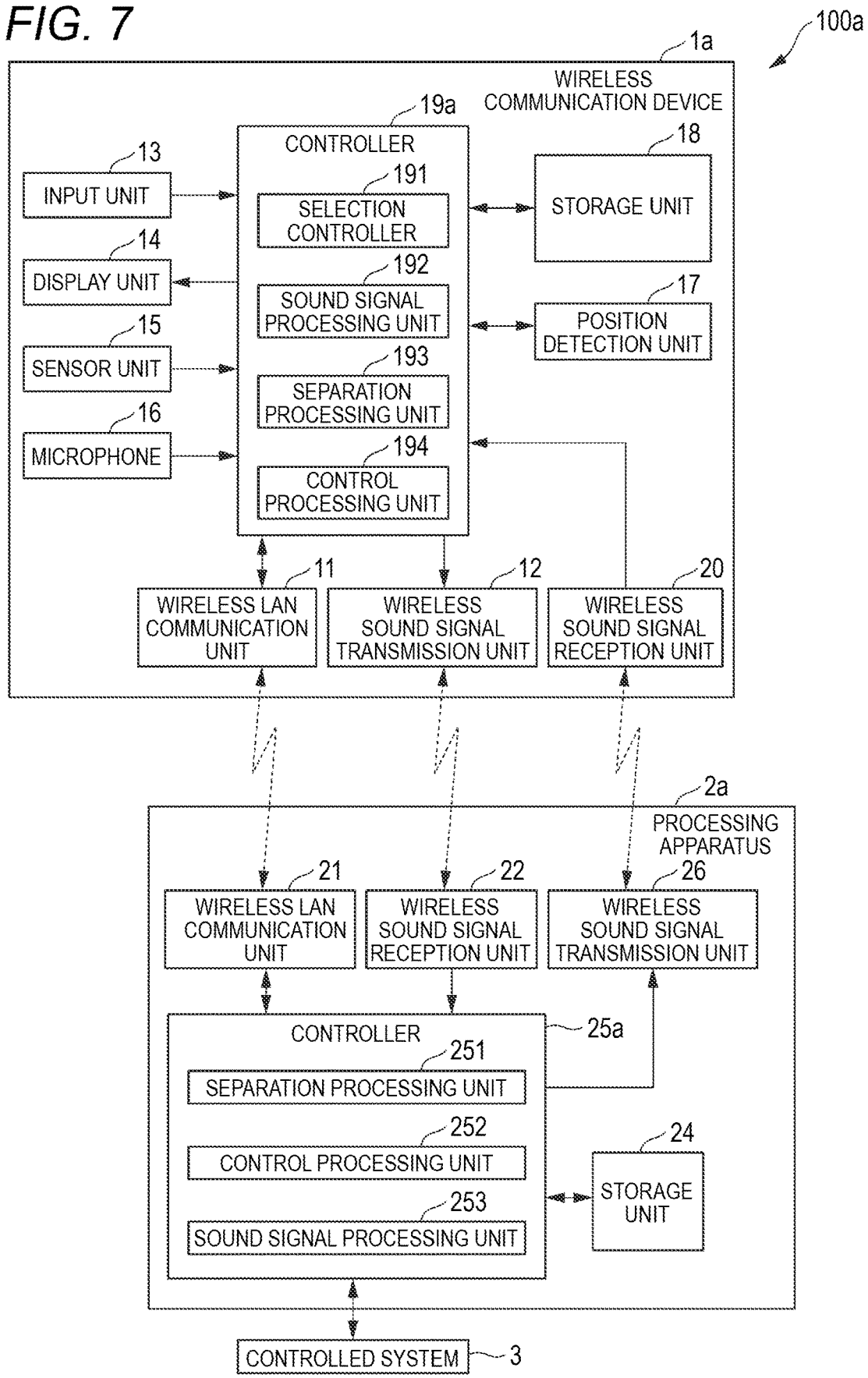
FIG. 7 is a block diagram showing an example of a wireless communication system according to a second embodiment.

FIG. 7 is a block diagram showing: an example of the wireless communication system 100a according to the present embodiment.

As shown in FIG. 7, the wireless communication system 100a includes the wireless communication device 1a, a processing apparatus 2a, and the controlled system 3.

In FIG. 7, the same configurations as those in FIG. 1 described above are denoted by the same reference numerals, and description thereof will be omitted.

The wireless communication device 1a is, for example, a smartphone, or a tablet terminal, and is a communication device that can be carried by a user in an event such as a concert or a live performance. The wireless communication device 1a includes the wireless LAN communication unit 11, the wireless sound signal transmission unit 12, the input unit 13, the display unit 14, the sensor unit 15, the microphone 16, the position detection unit 17, the storage unit 18, a controller 19a, and the wireless sound signal reception unit 20.

The wireless sound signal reception unit 20 (an example of a sound signal reception unit) receives a sound signal from the processing apparatus 2a by a wireless microphone communication method (second wireless communication method). Here, control information transmitted from the wireless communication device 1a to the processing apparatus 2a is referred to as first control information, and control information transmitted from the processing apparatus 2a to the wireless communication device 1a is referred to as second control information. The wireless sound signal, reception unit 20 receives a sound signal in which the second control information different from the first control information is embedded from the processing apparatus 2 (another wireless communication device) connected by the wireless microphone communication method.

The controller 19a is, for example, a processor including a CPU, and executes various kinds of control of the wireless communication device 1a. The controller 19a includes the selection controller 191, the sound signal processing unit 192, a separation processing unit 193, and a control processing unit 194.

A basic function of the controller 19a is the same as that of the controller 19 of the first embodiment, and is different from that of the controller 19 of the first embodiment in that the separation processing unit 193 and the control processing unit 194 are provided.

The separation processing unit 193 separates the control information second control information) included in the sound signal received by the wireless sound signal reception unit 20. Since a function of the separation processing unit 193 is the same as the function of the separation processing unit 251, description thereof will be omitted here.

The control processing unit 194 acquires the second control information embedded in the sound signal received by the wireless sound signal reception unit 20, and executes a processing based on the second control information.

The processing, apparatus 2a (an example of another wireless communication device) includes the wireless LAN communication unit 21, the wireless sound signal reception unit 22, the storage unit 24, a controller 25a, and a wireless sound signal transmission unit 26.

The wireless sound signal transmission unit 26 transmits a sound signal to the wireless communication device 1a by the wireless microphone communication method (second wireless communication method). The wireless sound signal transmission unit 26 transmits the sound signal in which the second control information is embedded from the processing apparatus 2 to the wireless communication device 1a by the wireless microphone communication method.

The controller 25a is, for example, a processor including a CPU, and executes various kinds of control of the processing apparatus 2a. The controller 25a includes the separation processing unit 251, the control processing unit 252, and a sound signal processing unit 253.

A basic function of the controller 25a is the same as that of the controller 25 of the first embodiment, and is different from that of the controller 25 of the first embodiment in that the sound signal processing unit 253 is provided.

The sound signal processing unit 253 executes a processing of embedding the control information (second control information) in a sound signal. Since a function of the sound signal processing unit 253 is the same as the function of the sound signal processing unit 192, description thereof will be omitted here.

In the present embodiment, the wireless communication device 1a, using the wireless sound signal transmission unit 12 and the wireless sound signal reception unit 20, and the processing apparatus 2a, using the wireless sound signal reception unit 22 and the wireless sound signal transmission unit 26, bidirectionally communicate with each other. That is, the wireless communication device 1a embeds the first control information in the sound signal and transmits the first control information to the processing apparatus 2a by the wireless microphone communication method. The processing apparatus 2a embeds the second control information in the sound signal and transmits the second control information to the wireless communication device 1a by the wireless microphone communication method. Further, the processing apparatus 2a executes a processing based on the first control information, and the wireless communication device 1a executes a processing based on the second control information.

As described above, in the present embodiment, the control information of the first embodiment is the first control information. The wireless communication device 1a includes the wireless sound signal reception unit 20 (sound signal reception unit) and the control processing unit 194. The wireless sound signal reception unit 20 receives a sound signal in which the second control information different from the first control information is embedded from the processing apparatus 2 (another wireless communication device) connected by the wireless microphone communication method. The control processing unit 194 acquires the second control information embedded in the sound signal received by the wireless sound signal reception unit 20, and executes a processing based on the second control information. Then, the own wireless communication device 1a and the processing apparatus 2a (another wireless communication device) bidirectionally communicate with each other by using the wireless sound signal transmission unit 12 and the wireless sound signal reception unit 20.

Accordingly, the wireless communication device 1a according to the present embodiment can perform the bidirectional communication, and thus can perform more complicated control processing. The wireless communication device 1a according to the present embodiment can acquire, for example, acknowledge information, feedback information, and the like for the control processing of the processing apparatus 2a as the control information from the processing apparatus 2a, and can perform the control processing with higher accuracy on the processing apparatus 2a based on the acknowledge information and the feedback information.

Third Embodiment

Next, a wireless communication system 100b and a wireless communication device 1b according to a third embodiment will be described with reference to FIG. 8. In the present embodiment, a modified example in which a plurality of controlled systems 3 are provided will be described.

Figure 8:
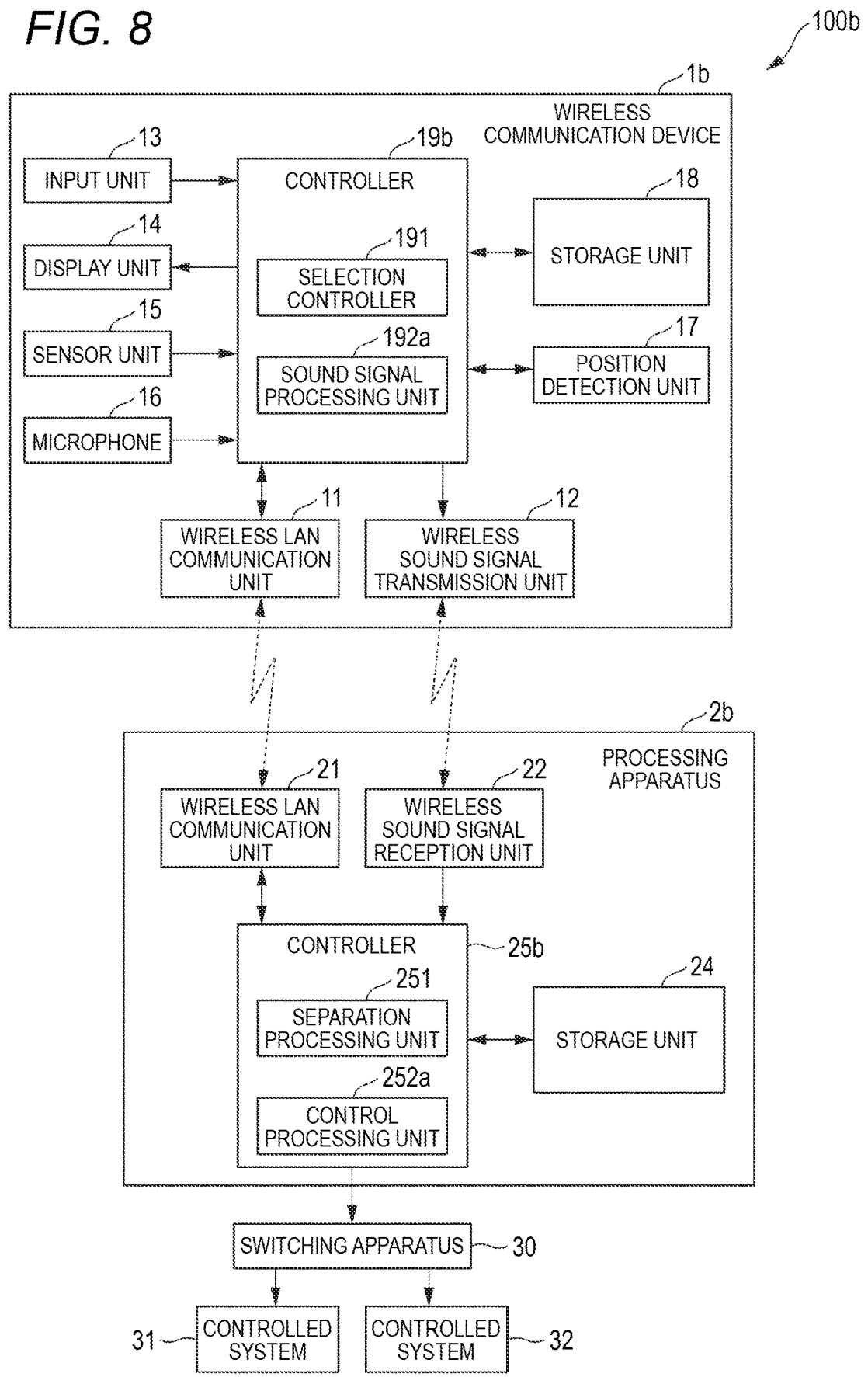
FIG. 8 is a block diagram showing an example of a wireless communication system according to a third embodiment.

FIG. 8 is a block diagram showing an example of the wireless communication system 100b according to the present embodiment.

As shown in FIG. 8, the wireless communication system 100b includes the wireless communication device 1b, a processing apparatus 2b, a switching apparatus 30, a controlled system 31, and a controlled system 32.

In FIG. 8, the same configurations as those in FIG. 1 described above are denoted by the same reference numerals, and description thereof will be omitted.

The wireless communication device 1b is, for example, a smartphone, or a tablet terminal, and is a communication device that can be carried by a user in an event such as a concert or a live performance. The wireless communication device 1b includes the wireless LAN communication unit 11, the wireless sound signal transmission unit 12, the input unit 13, the display unit 14, the sensor unit 15, the microphone 16, the position detection unit 17, the storage unit 18, and a controller 19b.

The controller 19b is, for example, a processor including a CPU, and executes various kinds of control of the wireless communication device 1b. The, controller 19b includes the selection controller 191 and a sound signal processing unit 192a.

When embedding control information in a sound signal, the sound signal processing unit 192a generates a sound signal to which a device ID for identifying a destination device is assigned.

The processing apparatus 2b includes the wireless LAN communication unit 21, the wireless sound signal reception unit 22, the storage unit 24, and a controller 25b.

The controller 25b is, for example, a processor including a CPU, and executes various kinds of control of the processing apparatus 2b. The controller 25b includes the separation processing unit 251 and a control processing unit 252a.

A basic processing of the control processing unit 252a is the same as that of the control processing unit 252 of the first embodiment, but in the present embodiment, the control processing unit 252a executes a control processing in accordance with a device ID assigned to the control information received from the wireless communication device 1b in order to correspond to the plurality of controlled systems 3.

The switching apparatus 30 is, for example, a public address (PA) device, and switches between the controlled system 31 and the controlled system 32 to transmit the control information and the sound signal.

The controlled system 31 and the controlled system 32 are systems of control targets, and are, for example, an acoustic system, a lighting system, or the like in an event venue.

Next, an operation of the wireless communication system 100b according to the present embodiment will be described.

For example, it is assumed that "ID01", "ID02", "ID03", "ID04", and "ID05" are assigned to device IDs of the wireless communication device 1b, the processing apparatus 2b, the switching apparatus 30, the controlled system 31, and the controlled system 32 in this order.

In a state where the device IDs are assigned as described above, for example, when control is performed by switching a control target from the controlled system 31 to the controlled system 32, the wireless communication system 100b executes the following processings.

(1) First, the wireless communication device 1b transmits control information for switching control from the controlled system 31 to the controlled system 32 to the processing apparatus 2b. The control information here includes the device ID of "ID03" as a destination. In this case, the processing apparatus 2b transfers the control information for switching control from the controlled system 31 to the controlled system 32 to the switching apparatus 30.

(2) Next, the switching apparatus 30 whose device ID is "ID03" switches control from the controlled system 31 to the controlled system 32 based on the control information.

(3) Next, the wireless communication device 1b transmits control information for controlling the controlled system 32 to the processing apparatus 2b. The control information here includes the device ID of "ID05" as a destination. In this case, the processing apparatus 2b transfers the control information to the switching apparatus 30, and the switching apparatus 30 transfers the control information to the controlled system 32.

(4) Next, the controlled system 32 whose device ID is "ID05" executes a processing (control processing) based on the control information.

In the present embodiment, the processing apparatus 2b may separate the sound signal and the control information and transmit the control information to the switching apparatus 30. Further, when each of the switching, apparatus 30, the controlled system 31, and the controlled system 32 has the same function as that of the separation processing unit 251, the processing apparatus 2b may transmit a sound signal in which control information not including anything other than its own device ID is embedded to the switching apparatus 30.

The wireless communication device 1b may transmit a sound signal in which the same control information is embedded to all devices including the processing apparatus 2b, the switching apparatus 30, the controlled system 31, and the controlled system 32 by broadcast communication including device IDs. In this case, the processing apparatus 2b, the switching apparatus 30, the controlled system 31, and the controlled system 32 execute the control processing on control information including their own device IDs, and ignore control information not including their own device IDs.

As described above, in the wireless communication system 100b according to the present embodiment, it is possible to perform control on a plurality of control targets (for example, the controlled system 31 and the controlled system 32) by switching the control targets by the switching apparatus 30 or by including a device ID in the control information.

Fourth Embodiment

Next, a wireless communication system 100c and a wireless microphone 10 according to a fourth embodiment will be described with reference to FIG. 9. In the present embodiment, a modified example in which the wireless microphone 10 is used as an example of a wireless communication device will be described.

Figure 9:
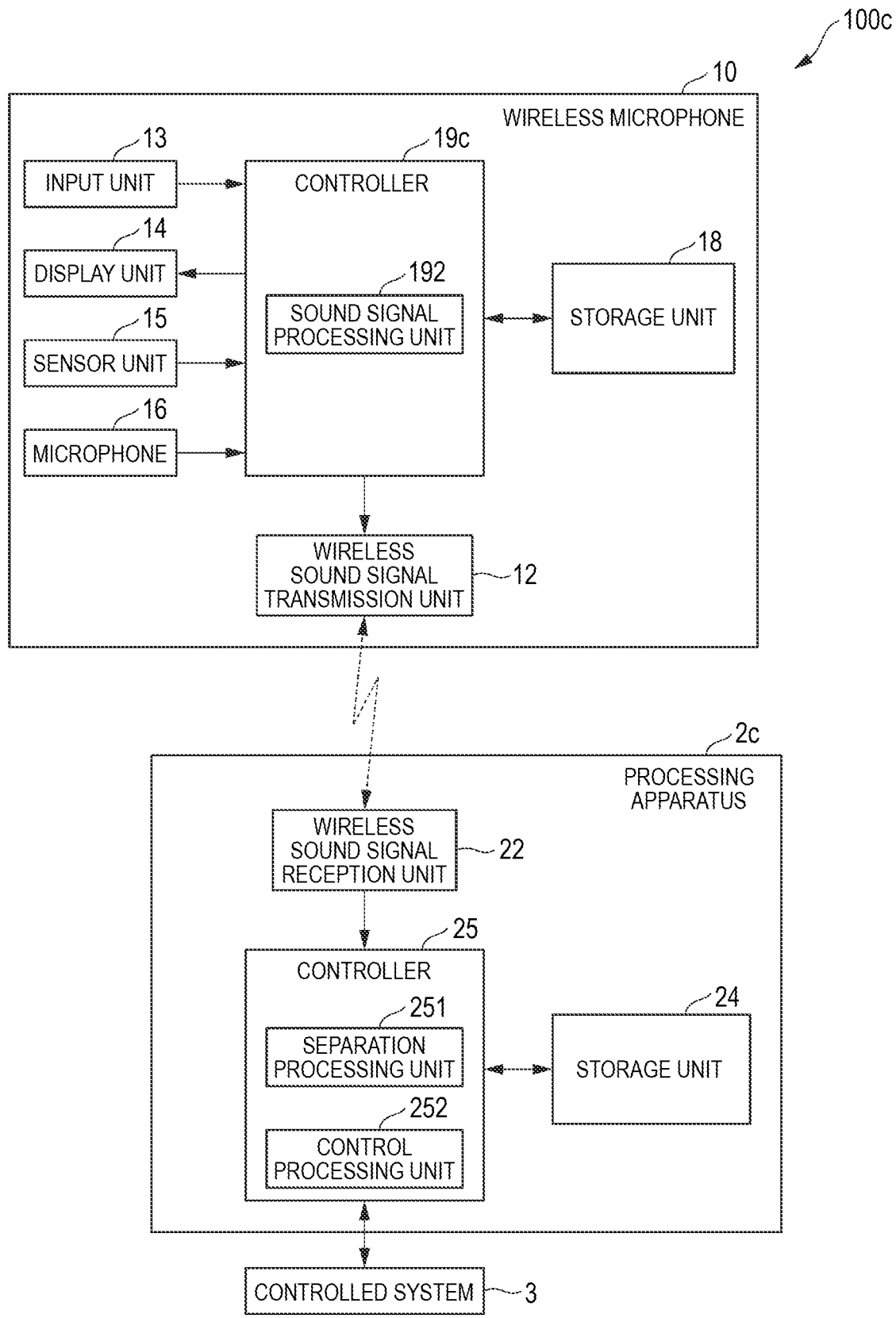
FIG. 9 is a block diagram showing an example of a wireless communication system according to a fourth embodiment.

FIG. 9 is a block diagram showing an example of the wireless communication system 100c according to the present embodiment.

As shown in FIG. 9, the wireless communication system 100c includes the wireless microphone 10, a processing apparatus 2c, and the controlled system 3. The wireless communication system 100c changes an effect amount (an effect amount of an acoustic processing or the like) of a sound signal output from the controlled system 3 in accordance with an inclination of the wireless microphone 10.

In FIG. 9, the same configurations as those in FIG. 1 described above are denoted by the same reference numerals, and description thereof will be omitted.

The wireless microphone 10 (an example of a wireless communication device) is a wireless microphone equipped with a gyro sensor, embeds the inclination of the microphone as control information in a sound signal, and transmits the inclination of the microphone to the processing apparatus 2c.

Further, the wireless microphone 10 includes the wireless sound signal transmission unit 12, the input unit 13, the display unit 14, the sensor unit 15, the microphone 16, the storage unit 18, and a controller 19c.

The sensor unit 15 is, for example, a gyro sensor, and detects angle information indicating an inclination of the wireless microphone 10 as detection information.

The controller 19c is, for example, a processor including a CPU, and executes various kinds of control of the wireless microphone 10. The controller 19c includes the sound signal processing unit 192.

In the present embodiment, the control information is the angle information indicating the inclination of the wireless microphone 10 detected by the sensor unit 15.

The sound signal processing unit 192 generates a sound signal in which the angle information is embedded as the control information.

The controller 19c transmits the sound signal in which the angle information is embedded to the processing apparatus 2c by the wireless microphone communication method by using the wireless sound signal transmission unit 12.

The processing apparatus 2c is the same as the processing apparatus 2 of the first embodiment except that the wireless LAN communication unit 21 is not provided. In the processing apparatus 2c, the .separation processing unit 251 separates the angle information included in the sound signal received by the wireless sound signal reception unit 22, and the control processing unit 252 executes a processing based on the angle information. Here, the processing based on the angle information is, for example, a processing of chancing the effect amount (the effect amount of the acoustic processing or the like) of the sound signal output from the controlled system 3 according to the inclination of the wireless microphone 10.

As described above, the wireless communication system 100c according to the present embodiment includes the sensor unit 15, the microphone 16 (sound collection unit), the wireless sound signal transmission unit 12, and the wireless microphone 10 (wireless communication device). The sensor unit 15 detects the detection information. The microphone 16 collects surrounding sound to generate the sound signal. The wireless sound signal transmission unit 12 embeds the detection information as the control information in the sound signal and transmits the detection information by the wireless communication.

Accordingly, since the wireless microphone 10 according to the present embodiment embeds the detection information of the sensor unit 15 in the sound signal and transmits the detection information, it is possible to implement simple and stable wireless communication and to perform more complicated control processing using the detection information.

In the wireless communication system 100c according to the present embodiment, the processing apparatus 2c executes a processing of changing the acoustic processing (effect) of the sound signal based on the control information (for example, the angle information).

Accordingly, the wireless communication system 100c according to the present embodiment can easily change the acoustic processing during play, so that performance of musical instrument play can he improved.

The present invention is not limited to the above-described embodiments, and can be changed within the scope not departing from the gist of the present invention.

For example, in the embodiments described above, an example in which the wireless sound signal transmission unit 12 is included in the wireless communication device 1 (1a, 1b) or the wireless microphone 10 has been described, but the present invention is not limited thereto, and for example, the wireless sound signal transmission unit 12 may be configured to be detachable from the wireless communication device 1 (1a, 1b) or the wireless microphone 10.

Further, in the embodiments described above, an example in which the wireless sound signal reception unit 22 is included in the processing apparatus 2 (2a, 2b, 2c) has been described, but the present invention is not limited thereto, and for example, the wireless sound signal reception unit 22 may be configured to be detachable from the processing apparatus 2 (2a, 2b, 2c).

In the embodiments described above, an example in which the sensor unit 15 is the gyro sensor has been described, but the sensor unit 15 is not limited thereto. The sensor unit 15 may be, for example, an acceleration sensor, a pressure sensor, a switch, a touch sensor, or an air volume sensor. The wireless communication system 100 (100a, 100b, 100c) may detect movement information of the wireless communication device 1 (1a, 1b) or the wireless microphone 10 as the control information by, for example, the acceleration sensor, and perform the control processing in accordance with the movement.

The wireless communication system 100c may detect a. pressure at which the wireless microphone 10 is gripped as the control information by, for example, the pressure sensor, and perform a control processing of changing an effect amount of an acoustic processing or sound volume adjustment of a sound signal to be output in accordance with the pressure at which the wireless microphone 10 is gripped. The wireless communication system 100c may detect an air volume (intensity of breath of the user) to the wireless microphone 10 as the control information by, for example, the air volume sensor, and perform the control processing of changing the effect amount of the acoustic processing or the sound volume adjustment of the sound signal to be output in accordance with the air volume (the intensity of the breath of the user) to the wireless microphone 10.

In the embodiments described above, an example in which the smartphone, the tablet terminal, or the wireless microphone is used as an example of the wireless communication device has been described, but the wireless communication device is not limited thereto, and may be, for example, a wireless communication device that can be mounted on a musical instrument (for example, a guitar). When the wireless communication device is the wireless communication device that can be mounted on the musical instrument, by transmitting a sound signal in which control information is embedded by wireless communication, wiring of the sound signal necessary for the musical instrument becomes unnecessary, and by changing movement or a direction of the musical instrument, various kinds of control such as the sound volume adjustment and the change of the effect amount of the acoustic processing can be performed, so that performance of musical instrument play can be improved.

In the first to third embodiments described above, an example in which the position detection unit 17 detects the position information by using the GPS has been described, but the position information may be detected by other methods.

Each configuration of the wireless communication system 100 (100a, 100b, 100c) described above includes a computer system therein. Then, the above-described processing of outputting buzz is stored in a computer-readable recording medium in a form of a program, and the above-described processing is performed by a computer reading and executing the program. Here, the computer-readable recording medium refers to a magnetic disk, a magneto-optical disk, a CD-ROM, a DVD-ROM, a semiconductor memory, or the like. Further, the computer program may be distributed to a computer by a communication line, and the computer that has received the distribution may execute the program.

What is claimed is:

1. A wireless communication device configured to communicate with another wireless communication device, the wireless communication device comprising:
   an information wireless communicator that is configured to transmit first control information to the other wireless communication device by a first wireless communication method, the first wireless communication method being a wireless LAN communication method;
   a sound signal transmitter that is configured to transmit a first sound signal to the other wireless communication device by a second wireless communication method different from the first wireless communication method, the second wireless communication method being a wireless microphone communication method; and
   a selection controller that is configured to select at least one of a first transmission processing of transmitting the first control information from the information wireless communicator to the other wireless communication device by the first wireless communication method and a second transmission processing of embedding the first control information in the first sound signal and transmitting the first control information from the sound signal transmitter to the other wireless communication device by the second wireless communication method,
   wherein the selection controller is configured to select the second transmission processing and to switch a processing from the first transmission processing to the second transmission processing when a wireless communication intensity of the first wireless communication method is equal to or smaller than a threshold.

2. The wireless communication device according to claim 1,
   wherein the selection controller is configured to select the second transmission processing when the sound signal transmitter is in a state in which the first sound signal is transmittable.

3. The wireless communication device according to claim 1,
   wherein the selection controller is configured to select the second transmission processing when the sound signal transmitter is connected to the other wireless communication device by the second wireless communication method.

4. The wireless communication device according to claim 1, further comprising:
   a sensor that is configured to detect detection information,
   wherein the first control information includes the detection information.

5. The wireless communication device according to claim 4,
   wherein the sensor is a gyro sensor, and
   wherein the sound signal transmitter transmits the detection information as the first control information.

6. A wireless communication system comprising:
   the wireless communication device according to claim 1; and
   a processing apparatus configured to receive the first sound signal in which the first control information is embedded from the wireless communication device and to execute a processing based on the first control information.

7. The wireless communication system according to claim 6,
   wherein the processing apparatus is configured to execute a processing of changing an acoustic processing of the first sound signal based on the first control information.

8. A wireless communication device comprising:
   an information wireless communicator that is configured to transmit first control information by a first wireless communication method;
   a sound signal transmitter that is configured to transmit a first sound signal by a second wireless communication method;

a selection controller that is configured to select at least one of a first transmission processing of transmitting the first control information from the information wireless communicator by the first wireless communication method or a second transmission processing of embedding the first control information in the first sound signal and transmitting the first control information from the sound signal transmitter by the second wireless communication method;

a sound signal receiver that is configured to receive a second sound signal in which second control information different from the first control information is embedded from another wireless communication device connected by the second wireless communication method; and a processor that is configured to acquire the second control information embedded in the second sound signal received by the sound signal receiver and to execute a processing based on the second control information, wherein the wireless communication device and the other wireless communication device are configured to perform bidirectional communication by using the sound signal transmitter and the sound signal receiver.

9. A wireless communication device comprising:

a sensor that is configured to detect detection information;

a sound collector that is configured to collect a surrounding sound to generate a sound signal; and a sound signal transmitter that is configured to embed the detection information in the sound signal as control information and to transmit the detection information by wireless communication, wherein the sensor is configured to detect, as the detection information, at least one of angle information indicating an inclination of the sound collector, movement information of the sound collector, pressure information with which the sound collector is gripped, or air volume information of the sound collector, and wherein the control information includes the angle information, the movement information, the pressure information, and the air volume information.

10. A wireless communication method for a wireless communication device configured to communicate with another wireless communication device, the wireless communication device including an information wireless communicator configured to transmit control information by a first wireless communication method, the first wireless communication method being a wireless LAN communication method, and a sound signal transmitter configured to transmit a sound signal by a second wireless communication method different from the first wireless communication method, the second wireless communication method being a wireless microphone communication method, the wireless communication method comprising:

a first transmission step of transmitting the control information from the information wireless communicator to the other wireless communication device by the first wireless communication method;

a second transmission step of embedding the control information in the sound signal and transmitting the control information from the sound signal transmitter to the other wireless communication device by the second wireless communication method; and a selection step of selecting at least one of the first transmission step and the second transmission step by a selection controller, p1 wherein in the selection step, when wireless communication intensity of the first wireless communication method is equal to or smaller than a threshold, the second transmission step is selected by the selection controller, and the first transmission step is switched to the second transmission step.

11. The wireless communication method according to claim 10, wherein in the selection step, when the sound signal transmitter is in a state in which the sound signal is transmittable, the second transmission step is selected by the selection controller.

12. The wireless communication method according to claim 10, wherein in the selection step, when the sound signal transmitter is connected to the other wireless communication device by the second wireless communication method, the second transmission step is selected by the selection controller.

* * * * *